UNITED STATES PATENT OFFICE.

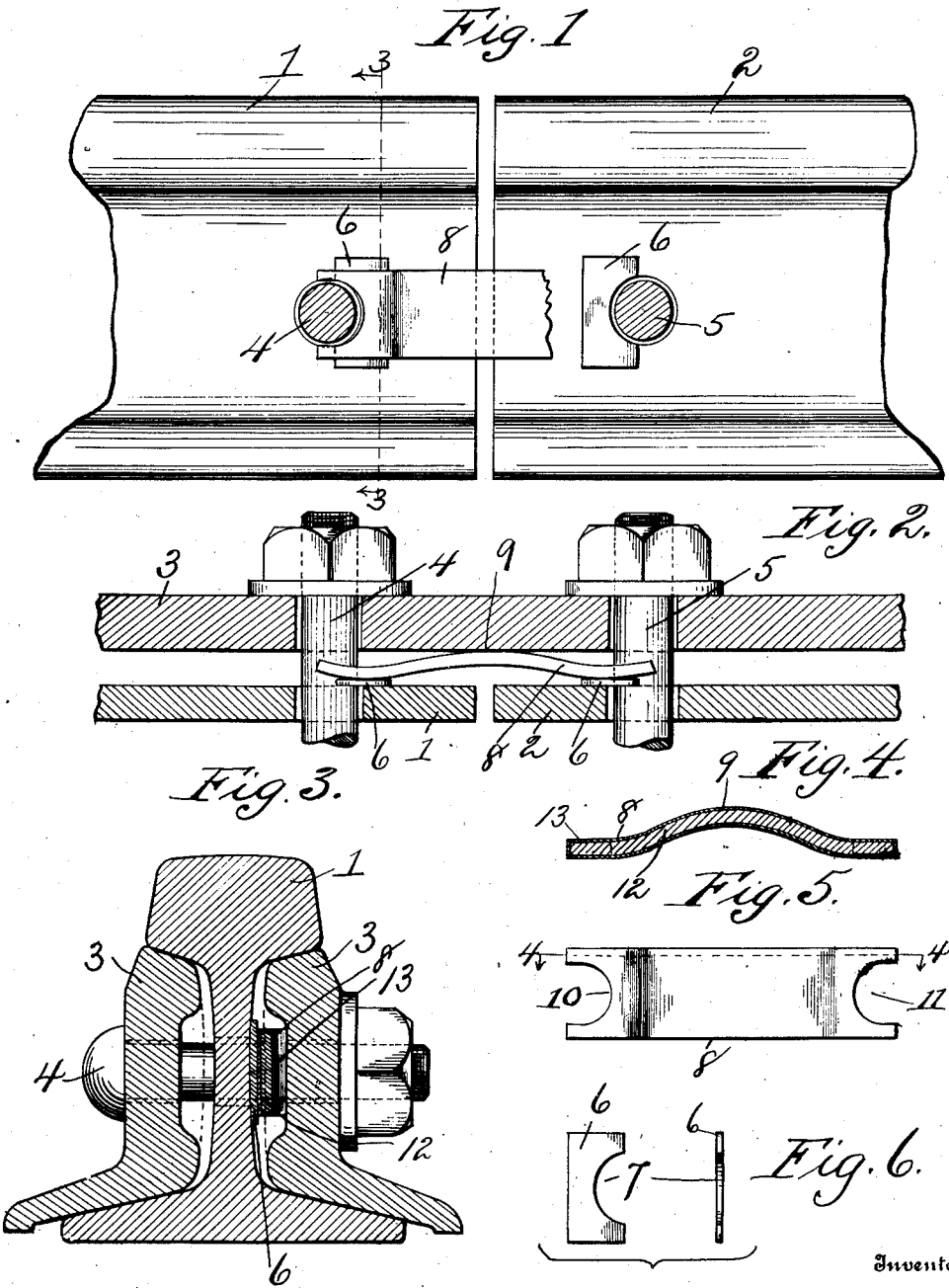

EDWIN H. McHENRY, OF NEW HAVEN, CONNECTICUT, ASSIGNOR OF ONE-FOURTH TO CHARLES H. MORRISON, OF NEW HAVEN, CONNECTICUT.

RAIL-BOND.

No. 907,083.  Specification of Letters Patent.  Patented Dec. 15, 1908.

Application filed March 16, 1908. Serial No. 421,316.

*To all whom it may concern:*

Be it known that I, EDWIN H. MCHENRY, a citizen of the United States, residing at New Haven, in the county of New Haven, State of Connecticut, have invented certain new and useful Improvements in Rail-Bonds, of which the following is a description, reference being had to the accompanying drawing and to the letters and figures of reference marked thereon.

My invention relates to new and useful improvements in rail bonds and the processes of making the same and has for an object to provide a rail bond which can quickly and easily be applied with very little cost and without the enlarging of the holes already made or the making of others.

A further object of my invention is to provide a spring rail bond which is so protected as not to corrode or rust, which will increase its durability and cause the same to retain its elasticity.

My invention consists in the matters hereinafter described and pointed out in the appended claims.

In the drawings which show by way of illustration one embodiment of my invention, Figure 1 is a side view partly in section, showing my improved bonding conductor, and the contact plates. Fig. 2 is a longitudinal sectional view. Fig. 3 is a transverse sectional view on the lines 3—3 of Fig. 1. Fig. 4 is a sectional view of the bonding conductor on the line 4—4 of Fig. 5. Fig. 5 is a top plan view of the conductor. Fig. 6 shows the contact plate in front and side elevation.

My invention is more especially adapted for electrically connecting the rails at present in use on steam railroads or the like, although it is obvious that from certain aspects of my invention, the same may be used to connect electrically, bars or rails of any character.

In the drawings, the rails 1 and 2 are shown as spaced slightly and said rails are joined by the usual fish plate or splice bar 3, and the bolts 4 and 5. Other bolts of course, may be used and I have only shown the two inner bolts in the present illustration of my invention. The contact plate 6 is preferably made of copper and is cut out on one side as at 7 to form an opening corresponding to the opening for the clamping bolt. Said copper contact piece or plate 6, is preferably brazed to each of the rails at a point between the inner bolt hole and the ends of the rail as clearly shown in Fig. 1 of the drawings.

My bonding conductor 8 is made of spring steel, and is preferably bowed as at 9, as shown in Figs. 2 and 4 of the drawing. Said conductor or rail bond is cut away at each end as at 10 and 11, so that when said bond is placed between the fish plate or splice bar 3 and the rails, the outer cut away portions of said bond engage loosely the bolts 4 and 5. As clearly shown in Fig. 2, the outer end of said bond 8 engages the contact plates 6, 6 and the bowed portion of said bond engages the fish plate or splice bar 3. It will be readily seen that when the splice bar is clamped in position the bond will be firmly clamped against the contact plate and the bolts lying in the cut away portions of said bond, will hold the same in place.

In making my bond, I take a spring steel bar 12 to which I weld a thin layer of copper or other non-corrosive conductive metal 13, as clearly shown in Figs. 3 and 4. After the copper is welded to the steel core, I temper the same. The tempering of the bond after coating with the copper, retains a certain amount of the carbon that is usually lost during the process of tempering. This causes the bond to retain its elasticity a greater length of time and makes a more efficient and durable rail bond. Then again, by coating the steel core with copper, I provide a coating for said steel core which prevents the steel from rusting or corroding.

It will thus be seen that I provide a rail bond which will be readily applied to existing rail joints without enlarging the holes or making new holes in said rails or fish plates which would have a tendency to weaken the joint. It will also be seen that I have provided a rail bond which can be readily applied to the present rail joints without using new bolts or in any way changing the joint for the reason that said bond takes up very little space between the fish plate and the rail. It will be further seen that my rail bond is not affected by the weather and is firmly held in place and therefore forms a very durable connection between said rails. It will also be noted that my rail bond has a sliding connection with the contact plates, and therefore, the expansion and contraction of the rails does not in any way affect the connection.

The bond carries practically the entire electric current from one rail to the other and requires only the two electric contacts which are brazed on each rail. Therefore, the resistance offered by my conductor, is reduced to a minimum. Furthermore, the spring pressure of the bond 8 against the fish plate or angle bar 3 forces the same out from the rails and gives a constant pressure against the nuts on bolts. This constant pressure has a tendency to hold the bolts tight, and prevent them from jarring loose, therefore, it acts as a nut lock indirectly.

Having thus particularly described my invention, what I claim as new and desire to secure by Letters Patent, is:—

1. The process of making a rail bond, consisting in welding a thin layer of copper to a spring steel core, so as to form a coating therefor, and tempering said core after the same is coated with the copper.

2. A rail bond consisting of a spring steel core and a thin layer of copper welded thereto, so as to form a coating therefor.

3. A rail bond consisting of a spring steel core, provided with a coating of copper.

4. The combination with spaced bars, a bonding conductor therefor consisting of a spring steel core having a thin layer of copper welded thereto, and copper plates brazed to said bar, said bonding conductor having a sliding contact with said plates, and means for holding the conductor in contact with said plates.

5. The combination with a pair of rails, splice bars joining said rails, bolts for securing said splice bars in place, bowed spring steel bonding conductors located between said splice bars and said rails, said conductors having their ends concaved to fit loosely said bolts, and contact plates brazed to said rails against which the conductors are held by the splice bars, said conductors having a non-corroding conducting coating thereon.

In testimony whereof I affix my signature, in presence of two witnesses.

EDWIN H. McHENRY.

Witnesses:
RAYMOND C. SCHNEIDER,
GEORGE E. GRISWOLD.